3,212,952
DECORATIVE DEVICE
Jonathan Turner, Chicago, Ill., assignor to Turner Mfg. Co., Chicago, Ill., a corporation of Illinois
Filed Feb. 28, 1962, Ser. No. 176,366
1 Claim. (Cl. 161—5)

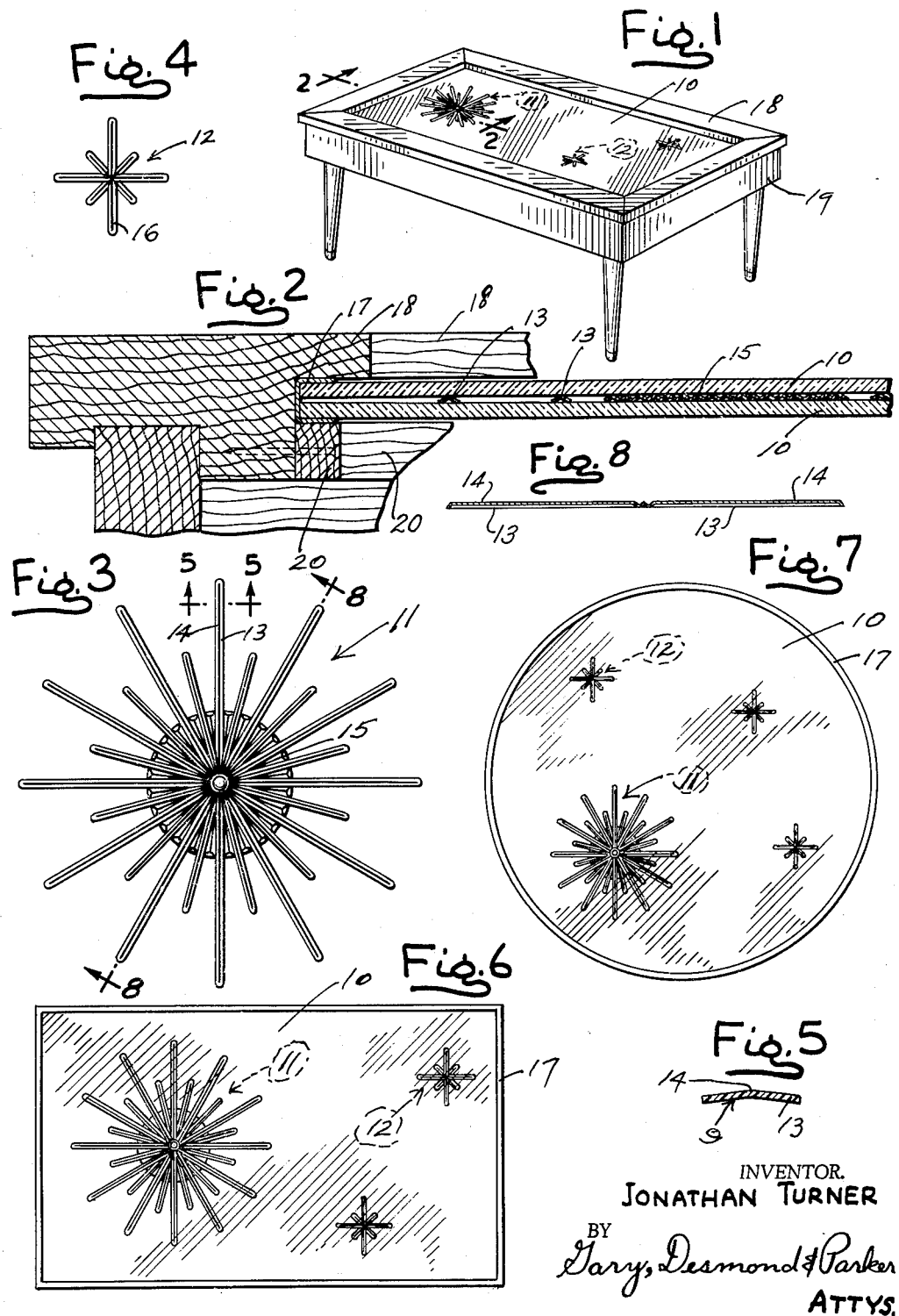

This invention relates to the production of decorative devices such as furniture and more particularly to the production of novel decorative table tops.

It is an object of the present invention to produce decorative furniture such as tables with glass tops embodying novel decorative components of three-dimensional character simulating designs in relief in the glass table tops.

It is a further object of the present invention to provide a decorative glass top assembly which may be formed as a preassembled unit and subsequently combined with a table top in a simple manner.

Other objects and advantages of the present invention, its details of construction, arrangement of parts and the economies thereof will be apparent from a consideration of the following specification and accompanying drawings wherein:

FIG. 1 is a perspective view of a table embodying an ornamental glass top formed in accordance with the present invention;

FIG. 2 is an enlarged fragmentary sectional view on line 2—2 of FIG. 1;

FIG. 3 is a top plan view of a decorative component insert;

FIG. 4 is a simulated view of another decorative insert design;

FIG. 5 is an enlarged section on line 5—5 of FIG. 3;

FIG. 6 is a plan view of a glass table top embodying the decorative components of FIGS. 3 and 4; and FIG. 7 is a plan view of a table top embodying the decorative components of FIGS. 3 and 4 in another arrangement, and in this case of a round table top insert.

FIG. 8 is a section taken on the line 8—8 of FIG. 3.

Referring to the drawings, reference numerals 10, 10 indicate a pair of transparent glass plates. These glass plates may be composed of, for example, single strength window glass having an average thickness of .091 inch or double strength window glass having an average thickness of .125 inch.

In accordance with the present invention, I dispose in a suitable, preferably balanced, manner preformed or embossed decorative ornaments such as ornament 11 generally shown in FIG. 3 or the ornament 12 generally shown in FIG. 4. In a preferred embodiment of the present invention, these ornaments are composed of relatively thin thermoplastic sheet material such as, for example, cellulose acetate butyrate which has been suitably pre-colored such as, for example, in gold, silver, brass, etc., and formed to shape by the vacuum forming process from sheet stock not only to provide the overall planar design configuration but to provide a three-dimensional design.

Thus, for example, the radial components 13 are longitudinally ridged as at 14 so as to provide an embossed effect and a hollow underside 9. It will be understood that the inner design components 15 are similarly ridged, as is the case with the radial component 16 of ornament 12 shown in FIG. 4. Although the ornaments of FIGS. 3 and 4 are shown to be composed essentially of radially extending elements which have grooved bottoms, the ridging and grooving might be in another pattern such as circular alone or in combination with radial, or other configuration. These decorative ornamental inserts, which are composed of relatively thin opaque embossed colored thermoplastic sheet material, may be composed of sheet stock having a uniform thickness of .010 and when embossed or vacuum formed may have an overall thickness of about .020. This thin formed sheet stock when disposed between the glass plates 10, 10 in suitable ornamental arrangement as shown in FIGS. 6 and 7 or otherwise, provide a resilient spacing means between the glass plates 10, 10 and although under the weight at least of the uppermost glass plate the decorative ornaments 11 and 12 are somewhat compressed they do not flatten completely, but rather maintain a good portion of their embossed design to provide a three-dimensional effect which is aided by the reflective character imparted to the thermoplastic sheet by the coloring previously imparted thereto.

Thus, in forming a decorative table top assembly the decorative ornaments such as 11 and 12, which have been made by vacuum forming a thin sheet of colored thermoplastic material as aforesaid, and cutting the formed design therefrom, are placed in suitable arrangement on the lower glass plate 10, the upper glass plate 10 disposed thereover and the two glass plates with their embraced ornaments are then edgewise secured together such as by means of a pressure sensitive tape 17 to form a secured sandwich-like unit. In the alternative, the edge portions of the glass plates 10, 10 may be secured together by suitable adhesive means such as epoxy resin glue, or the like.

The assemblies as shown in FIGS. 6 and 7 comprise units which then are inserted in suitable frames such as the frame top portion 18 of the ornamental table 19, and then secured in place by means of the molding strips 20.

Since the table top is now composed of two transparent sheets of glass 10, 10, the interposed embossed ornaments which are opaque in color now provide a simulated engraved, etched or cut character thereto in an economical and eye-pleasing manner.

Although I have shown and described a preferred embodiment of my invention, it is to be understood to those skilled in the art that changes may be made in details thereof without departing from its scope as comprehended by the following claim.

I claim:

A table top unit comprising a pair of coextensive transparent glass panels, holder means edgewise embracing said panels, and at least one embossed decorative insert disposed between and resiliently spacing said panels, said insert being composed of relatively thin, colored, thermoplastic, flexible sheet material of uniform thickness shaped to define a plurality of radially extending arms deformed from the plane of the sheet to define upwardly projecting, hollow downwardly opening resiliently compressible protuberances.

References Cited by the Examiner

UNITED STATES PATENTS

| | | | |
|---|---|---|---|
| 906,931 | 12/09 | Rattay | 311—106 |
| 1,207,460 | 12/16 | Zindel | 311—106 |
| 1,143,601 | 6/18 | Smith | 161—1 XR |
| 1,358,995 | 11/20 | Sodemann | 311—106 |
| 1,488,889 | 4/24 | Lollis | 311—106 |
| 1,586,114 | 5/26 | Pence | 161—1 XR |
| 1,738,429 | 12/29 | Heyman | 311—106 |
| 1,825,464 | 9/31 | Lopez | 311—106 |
| 1,875,864 | 9/32 | Gibian | 311—106 |
| 2,131,039 | 9/38 | Draeger | 311—106 |
| 2,158,633 | 5/39 | Normandi | 311—106 |
| 2,276,108 | 3/42 | Skolnik | 311—106 XR |
| 2,277,752 | 3/42 | Frey | 311—106 |
| 2,555,505 | 6/51 | Plumbo | 161—1 XR |
| 3,146,155 | 8/64 | Trenner | 161—139 |

FOREIGN PATENTS 1,249,888  11/60  France.

EARL M. BERGERT, *Primary Examiner.*

JACOB STEINBERG, G. L. BREHM, *Examiners.*